United States Patent
Kamprath et al.

(10) Patent No.: US 10,248,961 B1
(45) Date of Patent: *Apr. 2, 2019

(54) CHARACTERIZING AN ENTITY IN AN IDENTIFIER SPACE BASED ON BEHAVIORS OF UNRELATED ENTITIES IN A DIFFERENT IDENTIFIER SPACE

(71) Applicant: Quantcast Corporation, San Francisco, CA (US)

(72) Inventors: Michael F. Kamprath, Mountain View, CA (US); Sean McCormick, Oakland, CA (US); Scott Michael Murff, Burlingame, CA (US)

(73) Assignee: Quantcast Corporation, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/078,160

(22) Filed: Mar. 23, 2016

Related U.S. Application Data

(63) Continuation of application No. 13/937,864, filed on Jul. 9, 2013, now Pat. No. 9,330,209.

(51) Int. Cl.
| | |
|---|---|
| *G06Q 30/02* | (2012.01) |
| *G06Q 10/06* | (2012.01) |
| *H04L 29/08* | (2006.01) |
| *H04N 21/81* | (2011.01) |
| *H04N 21/462* | (2011.01) |

(52) U.S. Cl.
CPC ....... *G06Q 30/0201* (2013.01); *G06Q 10/067* (2013.01); *G06Q 30/0241* (2013.01); *G06Q 30/0251* (2013.01); *G06Q 30/0269* (2013.01); *G06Q 30/0276* (2013.01); *H04L 67/22* (2013.01); *H04L 67/306* (2013.01); *H04N 21/4622* (2013.01); *H04N 21/812* (2013.01)

(58) Field of Classification Search
None
See application file for complete search history.

(56) References Cited

U.S. PATENT DOCUMENTS

| | | | |
|---|---|---|---|
| 7,698,422 B2 | 4/2010 | Vanderhook et al. | |
| 8,438,280 B1 * | 5/2013 | Sutter | H04N 21/2402 705/14.51 |
| 8,448,057 B1 | 5/2013 | Sugnet et al. | |

(Continued)

OTHER PUBLICATIONS

United States Office Action, U.S. Appl. No. 13/937,864, dated Oct. 2, 2015, 12 pages.

*Primary Examiner* — Kibrom K Gebresilassie
(74) *Attorney, Agent, or Firm* — Robin W. Reasoner

(57) ABSTRACT

Models are built based on existing histories in one identifier space to infer features of entities in a different identifier space. A source model is built using features of an archetypical population in a given identifier space and the standard population. A join panel, i.e., a set of entities operating across both the given identifier space and a second disjoined identifier space, is scored using the source model. Based on the scores and features associated with the entities in the join panel within the second identifier space, a target model specific to the second identifier space is built. An audience of entities within the second identifier space can then be scored using the target model to identify entities that are similar to the archetypical population.

16 Claims, 4 Drawing Sheets

(56) References Cited

U.S. PATENT DOCUMENTS

| | | | |
|---|---|---|---|
| 8,533,141 B2 * | 9/2013 | Doig | G06Q 30/0243 |
| | | | 706/45 |
| 8,898,164 B1 | 11/2014 | Feldman et al. | |
| 9,159,029 B1 * | 10/2015 | Kamprath | G06N 7/005 |
| 9,189,652 B1 | 11/2015 | Sutter | |
| 9,330,209 B1 * | 5/2016 | Kamprath | G06Q 30/0254 |
| 2004/0003042 A1 * | 1/2004 | Horvitz | G06Q 10/109 |
| | | | 709/204 |
| 2004/0181525 A1 | 9/2004 | Itzhak et al. | |
| 2005/0021406 A1 * | 1/2005 | Ohyama | G06Q 30/02 |
| | | | 705/14.4 |
| 2006/0195441 A1 | 8/2006 | Julia et al. | |
| 2007/0233671 A1 * | 10/2007 | Oztekin | G06F 17/30867 |
| 2007/0294401 A1 * | 12/2007 | Shkedi | G06O 30/02 |
| | | | 709/224 |
| 2008/0086741 A1 * | 4/2008 | Feldman | G06Q 30/02 |
| | | | 725/13 |
| 2010/0211960 A1 | 8/2010 | Sirajuddin et al. | |
| 2010/0217660 A1 * | 8/2010 | Biswas | G06Q 30/02 |
| | | | 705/14.38 |
| 2010/0241698 A1 * | 9/2010 | Hillerbrand | H04L 41/00 |
| | | | 709/203 |
| 2011/0022621 A1 | 1/2011 | Luo et al. | |
| 2011/0082824 A1 | 4/2011 | Allison et al. | |
| 2012/0023046 A1 * | 1/2012 | Verma | G06Q 30/02 |
| | | | 706/12 |
| 2012/0239458 A9 * | 9/2012 | Hanna | G06Q 30/02 |
| | | | 705/7.33 |
| 2013/0124309 A1 * | 5/2013 | Traasdahl | H04L 67/22 |
| | | | 705/14.49 |
| 2013/0124315 A1 * | 5/2013 | Doughty | G06Q 30/0269 |
| | | | 705/14.53 |
| 2013/0262225 A1 * | 10/2013 | Ahrens | G06Q 30/0243 |
| | | | 705/14.53 |
| 2013/0262242 A1 * | 10/2013 | Tateo | G06Q 30/0276 |
| | | | 705/14.72 |
| 2013/0268357 A1 | 10/2013 | Heath | |
| 2014/0032301 A1 * | 1/2014 | Fu | G06Q 30/0242 |
| | | | 705/14.41 |
| 2014/0052534 A1 * | 2/2014 | Gandhi | G06Q 50/01 |
| | | | 705/14.58 |
| 2014/0207567 A1 * | 7/2014 | Gould | G06Q 30/0246 |
| | | | 705/14.45 |
| 2014/0365296 A1 * | 12/2014 | McDonnell | G06Q 30/0246 |
| | | | 705/14.45 |
| 2015/0220492 A1 | 8/2015 | Simeonov et al. | |
| 2015/0241984 A1 | 8/2015 | Itzhaik | |
| 2016/0364935 A1 * | 12/2016 | Koehler | G06Q 30/0249 |

\* cited by examiner

CHARACTERIZING AN ENTITY IN AN IDENTIFIER SPACE BASED ON BEHAVIORS OF UNRELATED ENTITIES IN A DIFFERENT IDENTIFIER SPACE

CROSS-REFERENCE TO RELATED APPLICATION

This application is a continuation of U.S. patent application Ser. No. 13/937,864, now U.S. Pat. No. 9,330,209, entitled "Characterizing an Entity in an Identifier Space Based on Behaviors of Unrelated Entities in a Different Identifier Space", by Michael F. Kamprath, Sean McCormick, and Scott Michael Murff, filed on Jul. 9, 2013, which is hereby incorporated by reference in its entirety.

BACKGROUND

1. Technical Field

This invention pertains in general to modeling behavior of entities, and in particular to characterizing entities in an identifier space based on behaviors of unrelated entities in a different identifier space.

2. Description of Related Art

In recent times, entities access and interact with the digital content from within several operating environments, such as the internet, mobile devices, gaming consoles, etc. In each operating environment, information related to the entities, such as content consumption habits, may be captured. Such information can then be used by various organizations, such as ad marketers, to better serve content to the entities.

One major hurdle in using the information captured for different entities is that operating environments are often disparate from one another. Specifically, information captured for a user operating in one operating environment cannot seamlessly be attributed to that user in a different operating environment. Therefore, even when information related to a user exists in one operating environment, intelligent decisions regarding what content to serve to the user in a disparate operating environment cannot be made on the existing information. In such situations, a mechanism that enables the use of existing information for inferring information in a disparate operating environment is desired.

SUMMARY

Embodiments of the invention include a method, a non-transitory computer readable storage medium and a system for determining the similarity between entities operating across different identifier spaces. To determine the similarity between an archetypical population of entities operating in a first identifier space and a target entity operating in a second identifier space, histories captured for a join panel of entities in both the first and second identifier spaces are used. Specifically, a first model that judges the similarity of an entity to an archetypical population is applied to the histories captured in the first identifier space for the entities in the join panel. A second model is then built based on histories captured in the second identifier space for the entities in the join panel that are deemed to be similar to the archetypical population. The second model is applied to the history captured for the target entity in the second identifier space to determine the similarity between the target entity and the archetypical population.

Embodiments of the computer-readable storage medium store computer-executable instructions for performing the steps described above. Embodiments of the system further comprise a processor for executing the computer-executable instructions.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

Figure 1:
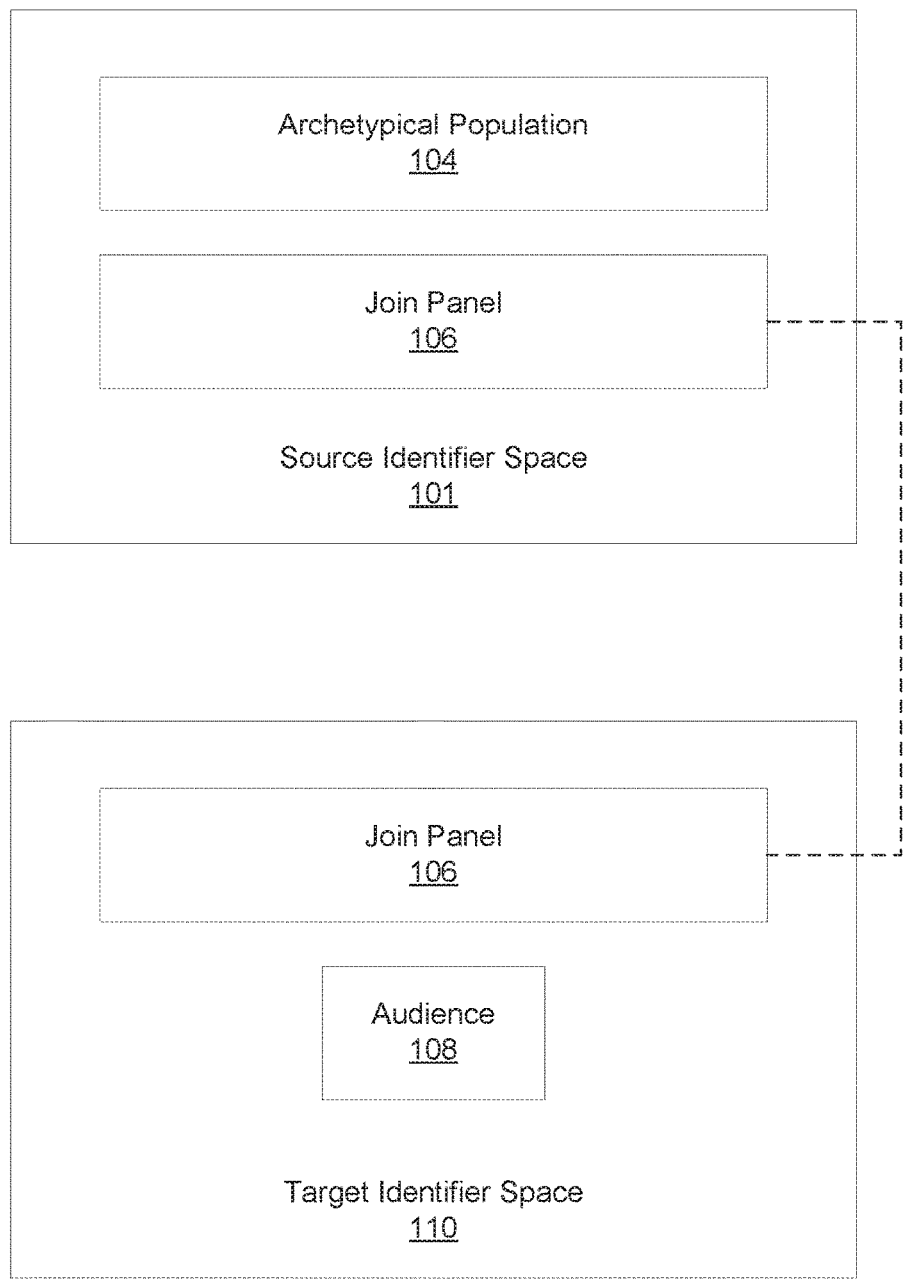
FIG. 1 illustrates two disjoined identifier spaces, in accordance with an embodiment of the invention.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

Embodiments of the invention build models to predict the similarity between a population of interest that operates in a first identifier space and an entity that operates in a second identifier space based on a join panel of entities that operates in both identifier spaces. Histories of the population of interest captured in the first identifier space are not mapped to histories captured in the second identifier space. Conversely, histories of the join panel of entities captured in the first identifier space are mapped to histories of the join panel captured in the second identifier space. Entities in the join panel that are similar to the population of interest are determined based on the histories of those entities captured in the first identifier space. The histories captured in the second identifier space of the entities in the join panel that are deemed to be similar to the population of interest are used to judge the similarity between the entity operating in the second identifier space and the population of interest operating in the first identifier space.

Entities and Identifier Spaces

An identifier space is an environment in which one or more entities operate, where each entity is associated with an identifier specific to that identifier space. In one embodiment, the entity identifier associated with an entity is anonymized, such that the identifier does not reveal the true identity of the entity. An identifier associated with an entity and specific to an identifier space does not readily map to an identifier associated with that entity and specific to a different identifier space. Identifier spaces include internet browsers (referred to herein as "the internet"), mobile systems, digital television systems, gaming systems, and in-vehicle systems, platform user logins and offline spaces, such as grocery store affinity cards. Further, a given identifier space may further include various identifier subspaces. For example, each application in a mobile system may be associated with its own identifier subspace within the mobile identifier space, such that an identifier specific to the identifier subspace associated with one mobile application does not map to an identifier specific to the identifier subspace associated with a different mobile application.

For each entity operating in an identifier space, a history is collected and recorded in association with the identifier associated with the entity in that identifier space. A history may include a media consumption history that provides information related to the entity's acts of accessing content from within the identifier space. A history may include behavioral indicators attributed to the entity based on observed behaviors of the entity within the identifier space. A history may include status information related to applications executed on devices operated by the entity. Because identifiers across different identifier spaces are generally not mapped, the same entity may operate in two disjoined identifier spaces, but the history of that entity in one identifier space cannot be attributed to that entity in the second identifier space without an explicit mapping between the identifiers associated with the entity.

A variety of methods exist for associating an identifier with an entity in an identifier space. For example, an identifier may be a hardware device identifier, such as a Media Access Control Address (MAC address), that can be stored on a device operated by an entity to access content over a network. As another example, a software identifier such as a cookie value can be locally stored. In other embodiments, identifiers can be composed and/or stored remotely from a device associated with the entity. In some cases, a browser being operated by the entity can have multiple identifiers, such as multiple first party cookies and multiple third party cookies, which can be used to identify the browser to various systems.

In the mobile identifier space, an identifier may be a device identifier of a mobile device on which several mobile applications are installed. The histories associated with each of the mobile applications may all be associated with the same device identifier. In alternative embodiments, each mobile application or a group of mobile applications installed on a mobile device may be associated with a different unique identifier within the mobile identifier space. Consequently, each mobile application or group of mobile applications operates as a separate entity, and the histories associated with all mobile applications installed on the mobile device are not associated with the same identifier. In such embodiments, each mobile application or group of mobile applications may operate in separate identifier subspaces within the mobile identifier space.

Figure (FIG. 1 illustrates two disjoined identifier spaces, a source identifier space 101 and a target identifier space 110, in accordance with an embodiment of the invention. As shown, the source identifier space 101 includes an archetypical population 104 and a join panel 106, and the target identifier space 110 includes the join panel 106 and an audience 108.

The source identifier space 101 and the target identifier space 110 are two disjoined identifier spaces in which entities operate. The archetypical population 104 is a set of entities that operates at least within the source identifier space 101. Because identifiers of the archetypical population 104 in the source identifier space 101 are generally not mapped to identifiers in the target identifier space 110, it is unknown how many, if any, of the members of the archetypical population 104 also operate within the target identifier space 110. Also, as discussed above, the history of that entity determined in the source identifier space 101 may not automatically be attributed to that entity in the target identifier space 110, and vice versa.

Each entity in the archetypical population 104 has a particular feature or a set of features. Generally, this feature or set of features is known or inferred from the histories of the entities that have been stored in connection with the respective unique identifier in the source identifier space 101 of each of the entities. The selection of the archetypical population 104 is described in further detail with reference to FIG. 2 below.

The join panel 106 is a set of entities that operates in both the source identifier space 101 and the target identifier space 110, and for each entity in the join panel 106, the associated identifier specific to the source identifier space 101 is mapped to the associated identifier specific to the target identifier space 110. Therefore, the history of the entity determined in the source identifier space 101 can be attributed to that entity in the target identifier space 110 and vice versa. In one embodiment, an entity in the join panel 106 is associated with an identifier that is applied to the entity in both the source identifier space 101 and the target identifier space 110. Specifically, for the entity, both the identifier specific to the source identifier space 101 and the identifier specific to the target identifier space 110 are mapped. In another embodiment, an entity in the join panel 106 may be identified based on probabilistic knowledge indicating that the entity operates in both source identifier space 101 and target identifier space 110. For example, the entity may have accessed a mobile application on a mobile device and a web page via a web browser from a different device from the same geographic location. The entity is then probabilistically known to operate in both the mobile identifier space and the internet identifier space. Other mechanisms for identifying entities that operate in the source identifier space 101 and the target identifier space 110 fall within the scope of this invention.

The audience 108 is a set of entities that operates at least within the target identifier space 110. The discussion below describes techniques for determining the similarity between the archetypical population 104 and an entity in the audience 108 based on the similarity between the archetypical population 104 and the join panel 106.

Server System

Figure 2:
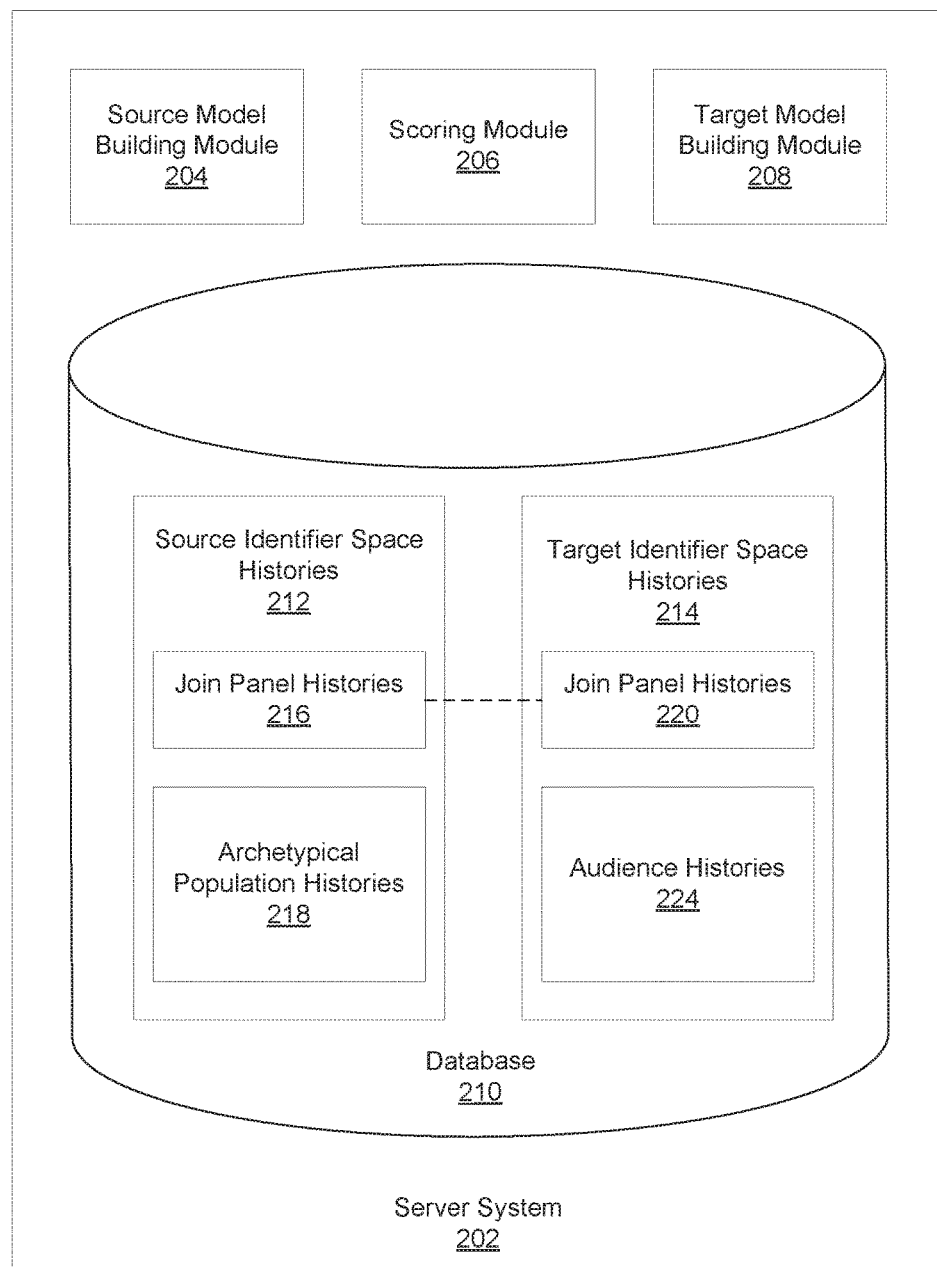
FIG. 2 is a high-level block diagram of a server system, in accordance with an embodiment of the invention.

FIG. 2 is a high-level block diagram of a server system 202, in accordance with an embodiment. The server system 202 stores histories, such as media consumption histories, of entities, builds models to predict the similarity between different entities, and applies a model to an entity's history. In some embodiments, the server system 202 is implemented as a single server, while in other embodiments it is implemented as a distributed system of multiple servers. For convenience of explanation, the server system 202 is described below as being implemented on a single server system. The server system 202 includes a source model building module 204, a scoring module 206, a target model building module 208 and a database 210.

The database 210 stores data needed by the server system 202 to build models and score the histories of entities based on those models. In operation, the database 210 records events in conjunction with an identifier, such as a cookie value. An event may be the act by an entity of accessing content over a network, such as, but not limited to, accessing a web page from a web server. An event may be a status of an application executing on a device operated by the entity. An event may be descriptive of an interaction with an application executing on a device. The database 210 may also record supplemental data in conjunction with an event, such as the browser version, the operating system that operates the browser as well as other characteristics of the computer system that operates the browser (e.g., screen resolution), any of which may be used as features in a model, as will be discussed below.

The database 210 stores source identifier space histories 212 that include consumption histories of entities operating in the source identifier space 101. Specifically, the source identifier space histories 212 includes join panel histories 216 associated with the join panel 106 operating in the source identifier space 101 and the archetypical population histories 218 associated with the archetypical population operating in the source identifier space 101. Each history stored in the source identifier space histories 212 is associated with an entity identifier specific to the source identifier space 101.

The database 210 also stores target identifier space histories 214 that include histories of entities operating in the target identifier space 110. Specifically, the target identifier space histories 214 include join panel histories 220 associated with the join panel 106 operating in the target identifier space 110 and audience histories 224 associated with the audience 108 operating in the target identifier space 110. Each history stored in the target identifier space histories 214 is associated with an entity identifier specific to the target identifier space 110. As discussed above, the entity identifiers associated with entities in the join panel 106 that are specific to the target identifier space 110 are mapped to the entity identifiers associated with those entities that are specific to the source identifier space 101. Therefore, the join panel histories 216 are linked to the join panel histories 220 based on the mappings between the entity identifiers associated with entities in the source panel 106 across the source identifier space 101 and the target identifier space 110.

The database 210 is shown as internal to the server system 202, but in other implementations, database 210 may be external to or remote from the server system 202. Also, only one instance of database 210 is shown in FIG. 2 for clarity, but in practice, the histories may be stored in a plurality of databases, such as a distributed network of storage facilities.

The source model building module 204 builds a model (referred to herein as the "source model") for judging the similarity between individual members of the join panel 106 and the archetypical population 104. To build the source model, the source model building module 204 identifies the archetypical population 104 from the entities operating in the source identifier space 101 based on pre-defined criteria. Such criteria may be tied to an advertising campaign and/or defined by a marketer in conjunction with the advertising campaign. Examples of criteria include entities within particular geographic boundaries, entities that access a particular type of content, entities that have purchased a particular item or type of item, etc. In one embodiment, source model building module 204 uses the pre-defined criteria to create a filter such that only entities operating in the source identifier space 101 that fulfill the criteria pass the filter.

The source model building module 204 also identifies a standard population, i.e., entities operating in the source identifier space 101 that are to be used for comparison purposes against the archetypical population 104. The standard population may be a general, or baseline population that does not meet the criteria defined for the archetypical population 104. In many cases, the archetypical population 104 may be dwarfed by the size of the standard population such that it is not practical or efficient to analyze the entire standard population. For convenience, the standard population may be down-sampled according to any technique known in the art to avoid having to manipulate massive amounts of data. In certain cases, the identified standard population may include entities present in the archetypical population. In such a case, because the standard population is typically much larger than the archetypical population, the entities in the standard population that are also present in the archetypical population are not excluded from the standard population.

In alternative embodiments, statistics for the general population, such as census data, may be used to form the standard population. In such embodiments, to build the model, the model building module 204 optionally extracts and selects features from the interaction histories and other data from the database 208 that are the most strongly correlated to being in the archetypical population as opposed to features of the general population as provided by the statistics.

To build the source model, the source model building module 204 optionally extracts and selects features from the archetypical population histories 218 and other data from the database 210 that are the most strongly correlated to being in the archetypical population 104 as opposed to the standard population. In operation, the source model building module 204 translates the histories included in the archetypical population histories 218 into a set of many features. For example, the features of a history may include websites visited, keyword searches entered, online purchases made, geographic location, topics from past ad opportunities, type of browser, etc.

Once the source model building module 204 has translated the data from the database 210 into a set of many features, the source model building module 204 determines which features are most strongly correlated with being in the archetypical population 104 versus the standard population and uses those features to form the source model. In other embodiments, feature selection need not be performed, particularly if there are no limitations on storage space for models.

The scoring module 206, in general, computes a score for an entity by analyzing the history of the entity against features of a model. The score quantifies the similarity between the entity and the archetypical population used to build the model. Specifically, the scoring module 206 scores an entity's history based on which features in the feature set of the applicable model are present in the entity's history. In such a manner, the scoring module 206 computes a score for each entity in the join panel 106 by applying the source model to the history of that entity stored in the join panel histories 216. The score for each entity in the join panel 106 indicates the similarity between the entity and the archetypical population 104. The scores for entities in the join panel resulting from the application of the source model to the histories of the join panel entities captured in the source identifier space 101 are referred to herein as "the join panel scores resulting from the application of the source model."

The target model building module 208 builds a model (referred to herein as the "target model") for judging the similarity between the archetypical population 104 and members of the audience 108 based on the join panel scores resulting from the application of the source model. In operation, the target model building module 208 determines which entities in the join panel 106 are going to contribute to the building of the target model (referred to herein as the "contributing entities"), based on the join panel scores resulting from the application of the source model.

To build the target model, the target model building module 208 translates the data in the histories included in the join panel histories 220 that are associated with the contributing entities into a set of many features. Again, the join panel histories 220 include histories associated with the join panel 106 and captured in the target identifier space 110. The target model building module 208 determines which features are most strongly correlated with being in the group of contributing entities versus the standard population in the target identifier space 110 and uses those features to build the target model. In one embodiment, the low-scoring join panel entities may be used as the standard population or as negative examples. The scoring module 206 computes a score for each entity in the audience 108 using the target model. The score for each entity in the audience 108 indicates the similarity between the entity and the archetypical population 104.

In one embodiment, the target model building module 208 determines the contributing entities by dividing the entities in the join panel 106 into two groups according to their scores from the application of the source model, a high-scoring group of entities (the contributing entities) having a score above a pre-determined threshold and a low-scoring group of entities has a score below the pre-determined threshold. Entities in the high-scoring group are each given a weight based on a respective score such that the highest scoring entity has a significantly higher weight than the lowest scoring entity. When determining which features to build the target model with, the target model building module 208 weights features according to the weight assigned to the contributing entity with whom the feature is associated. In such an embodiment, features associated with entities in the low-scoring group may not be used to build the target model or, alternatively, are used as being negatively correlated to being similar to the archetypical population 104.

The model building techniques described above may be daisy chained such that the target model may serve as a source model for computing the similarity between the archetypical population 104 and entities in a different join panel that operate within both the target identifier space 110 and a new identifier space (not shown). In one embodiment, the different join panel may include one or more entities also in the original join panel used to build the target model. The scores for the different join panel may be used to generate a target model for the new identifier space in the same manner as discussed above.

Figure 3:
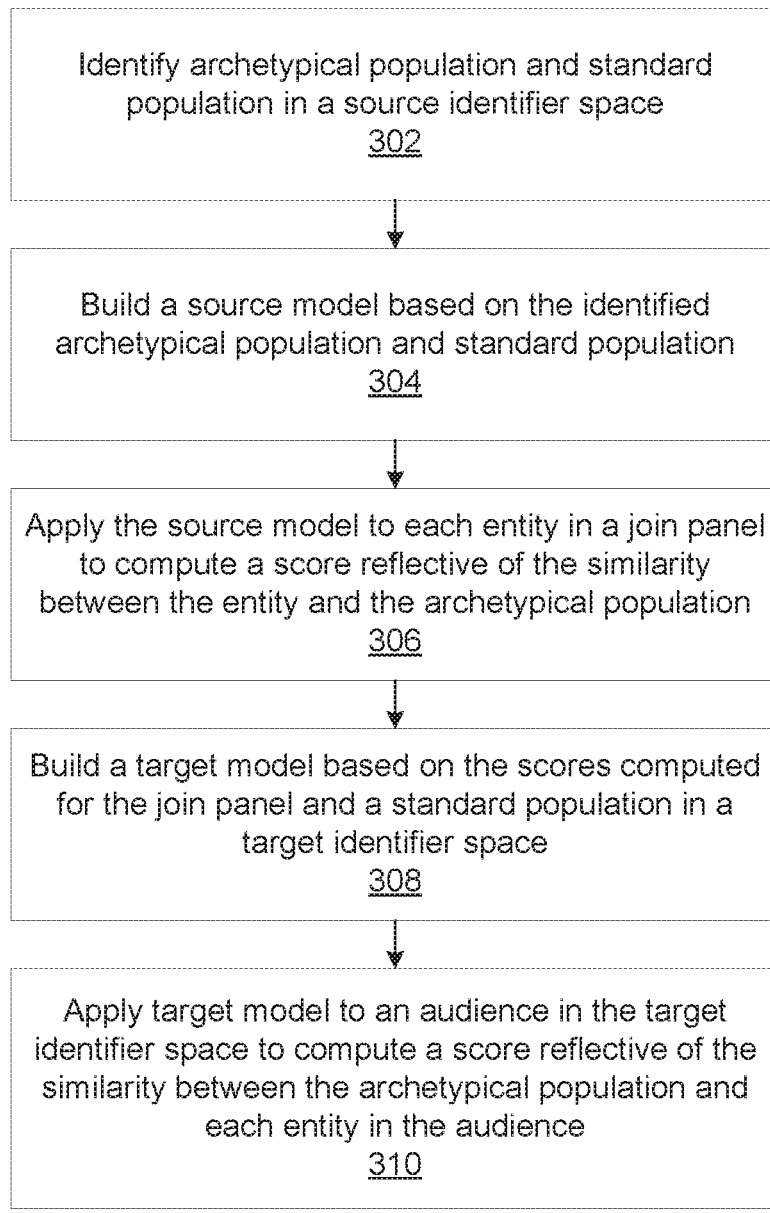
FIG. 3 is a flow chart illustrating a method of determining the similarity between entities across different identifier spaces using a join panel, in accordance with an embodiment of the invention.

FIG. 3 is a flow chart illustrating a method of determining the similarity between entities across different identifier spaces using a join panel, in accordance with an embodiment of the invention. The determination of the similarity may be performed, for example, by the server system 100. In some implementations, the steps are performed in an order other than the order presented in FIG. 3, and in other implementations, additional or alternative steps may be performed.

In step 302, the source model building module 204 identifies an archetypical population 104 and a standard population from the entities operating in a source identifier space 101. The archetypical population 104 is identified based on pre-defined criteria, and the standard population may be a general, or baseline population that does not meet the criteria defined for the archetypical population 104.

In step 304, the source model building module 204 builds a source model based on a feature set associated with the archetypical population 104 as compared to the standard population. The feature set associated with the archetypical population 104 is generated based on the archetypical population histories 218 included in the source identifier space histories 212. The source model is used for judging the similarity between the archetypical population 104 and a join panel 106 of entities that operates both in the source identifier space 101 and a target identifier space 110.

In step 306, the scoring module 206 applies the source model to the join panel 106 by computing a score for each entity in the join panel 106 using the source model. The score for each entity in the join panel 106 indicates the similarity between the entity and the archetypical population 104.

In step 308, the target model building module 208 builds a target model based on the scores computed by the scoring module 206 by applying the source model to the join panel 106. In operation, the target model building module 208 determines which entities are going to contribute to the building of the target model, based on the scores of the entities in the join panel 106 from the application of the source model. The target model building module 208 builds the target model based on a feature set associated with the contributing entities and a feature set associated with a standard population in the target identifier space 110. The feature set associated with the contributing entities is generated based on the join panel histories 220 included in the target identifier space histories 214.

In step 310, the scoring module 206 applies the target model to an audience of entities in the target identifier space 110 by computing a score for each entity in the audience 108 using the target model. The score for each entity in the audience 108 indicates the similarity between the entity in the target identifier space 110 and the archetypical population 104 in the source identifier space 101.

Examples of Building and Using Different Types of Target Models

Below are examples for using the model building techniques described above to provide information regarding entities operating across disjoined identifier spaces. Persons skilled in the art would recognize that these techniques may be used in other ways that are not explicitly discussed in the examples below but within the scope of the invention.

In one example, an advertiser running a brand campaign may want to direct its advertisements to a particular demographic, such as entities having an age range of 18 to 21. For discussion purposes, assume that the age range of a group of entities within the internet identifier space is known (either absolutely or through inference), but no such information exists for those entities or other entities in the mobile identifier space. To target entities in the mobile identifier space, a source model is built using features of the group of entities in the internet identifier space (the archetypical population) known or inferred to be in the age range of 18 to 21 as compared to the standard population (i.e., entities in any age range) using the techniques described above. A join panel, i.e., a set of entities operating across both the internet identifier space and the mobile identifier space, is scored using the source model. Based on the scores and features associated with the entities in the join panel within the mobile identifier space, a target model specific to the mobile identifier space is built. An audience of entities within the mobile identifier space can then be scored using the target model to identify entities likely to have an age range of 18 to 21. Advertisements from the advertiser can then be targeted to those entities, even though specific demographic information about those entities within the mobile identifier space is not known.

In another example, an advertiser may wish to present advertisements on the internet to entities that have downloaded a particular mobile application on their mobile devices. For a particular group of entities in the mobile identifier space, the feature of having downloaded the particular mobile application is associated with those entities in the mobile identifier space but not in the internet identifier space. Consequently, a source model may be built based on features associated with the particular group of entities (the archetypical population) and a standard population within the mobile identifier space. The source model can be used to score a join panel of entities, i.e., a set of entities operating across both the internet identifier space and the mobile identifier space. Based on the scores and features associated with the entities in the join panel within the internet identifier space, a target model specific to the internet identifier space is built. An audience of entities within the internet identifier space can then be scored using the target model to identify entities similar to the archetypical population, and thus those most likely to have downloaded a particular mobile application on their mobile device. Advertisements from the advertiser can then be targeted to those entities.

In yet another example, an organization may want to learn demographic information about entities that have downloaded a particular mobile application on their mobile devices. For discussion purposes, assume that demographic information of a group of entities within the internet identifier space is known (either absolutely or through inference), but no such information exists for those entities or other entities in the mobile identifier space. Consequently, a source model may be built using the group of entities (the archetypical population) and a standard population in the internet identifier space. Using a scored join panel, as discussed above, a target model may then be built in the target identifier space. The target model is used to score the entities that have downloaded the particular mobile application to determine the similarity between the archetypical population and those entities. The scores can be used to infer demographic information of the entities that have downloaded the particular mobile application.

In another example, the source identifier space is a grocery store affinity card space and the target identifier space is a digital television identifier space. A source model may be built using a group of entities (the archetypical population) in the card space which purchased a new premium yogurt and a standard population; the resulting source model predicts a grocery shopper's affinity for the new premium yogurt based on their other food shopping behaviors. For a subset of entities with the card, the identifier in the card space is mapped to their identifier in a digital television identifier space; this is the join panel. The entities in the join panel are scored using the source model. Using the join panel scores and the features of the join panel entities in the digital television identifier space, a target model may then be built in digital television identifier space that may be used to determine similarities between entities in the digital television identifier space and the archetypical population. An advertisement for the new premium yogurt may be shown to those entities in the target identifier space that are similar to the archetypical population (the group of entities in the card space which purchased the new premium yogurt).

One advantage of the techniques discussed above is the ability to determine the similarity between an entity operating in an identifier space and an archetypical population operating in a different identifier space even when the entity and the archetypical population have no history events in common (e.g., because the histories are captured in different identifier spaces).

Physical Components of a Computer

Figure 4:
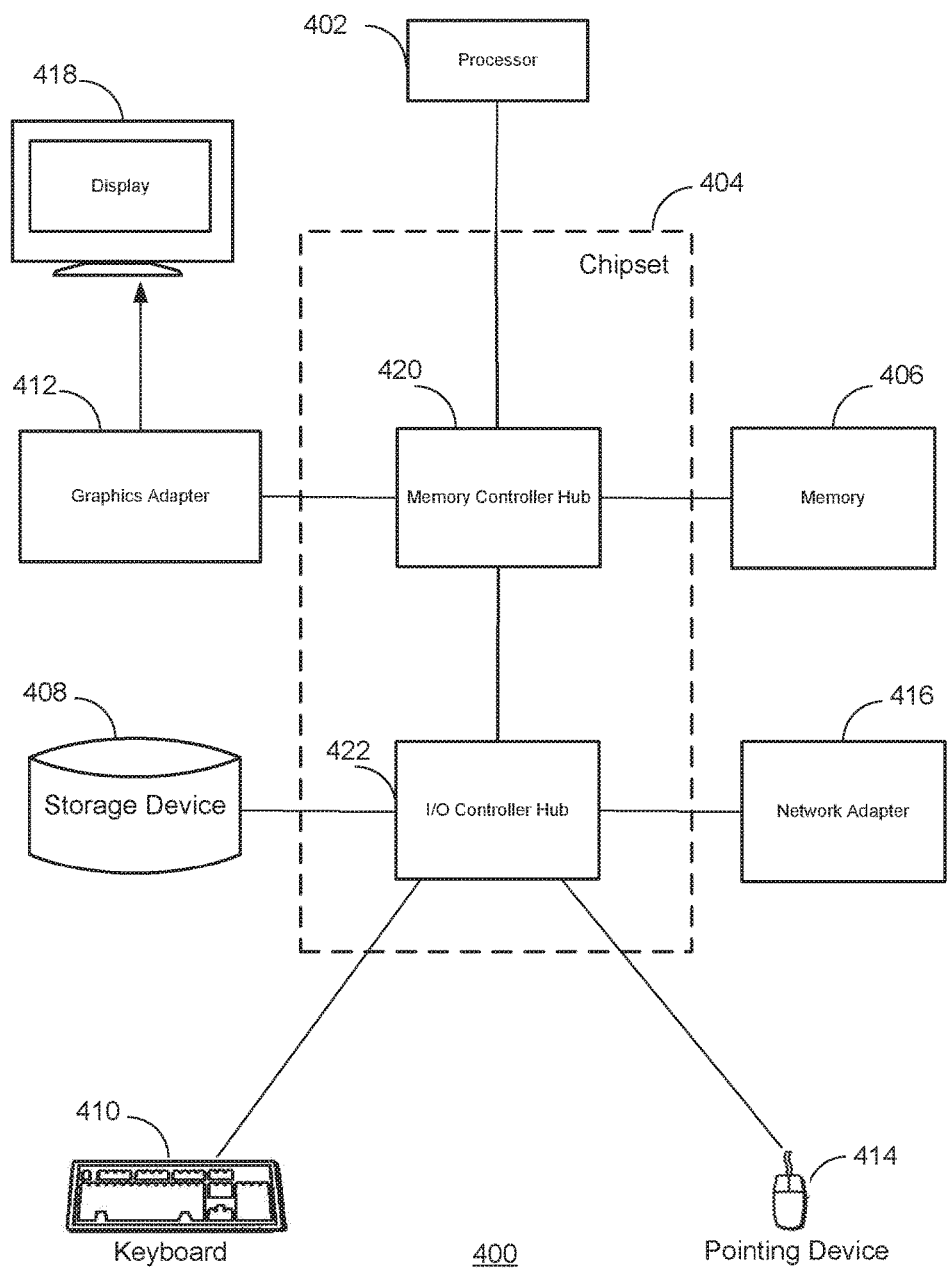
FIG. 4 is a high-level block diagram of the components of a computing system for use, for example, as the server system depicted in FIG. 1, in accordance with an embodiment.

FIG. 4 is a high-level block diagram of the components of a computing system 400 for use, for example, as the server system 202 depicted in FIG. 2, in accordance with an embodiment. Illustrated are at least one processor 402 coupled to a chipset 404. Also coupled to the chipset 404 are a memory 406, a storage device 408, a keyboard 410, a graphics adapter 412, a pointing device 414, and a network adapter 416. A display 418 is coupled to the graphics adapter 412. In one embodiment, the functionality of the chipset 404 is provided by a memory controller hub 420 and an I/O controller hub 422. In another embodiment, the memory 406 is coupled directly to the processor 402 instead of the chipset 404.

The storage device 408 is any non-transitory computer-readable storage medium, such as a hard drive, compact disk read-only memory (CD-ROM), DVD, or a solid-state memory device. The memory 406 holds instructions and data used by the processor 402. The pointing device 414 may be a mouse, track ball, or other type of pointing device, and is used in combination with the keyboard 410 to input data into the computer 400. The graphics adapter 412 displays images and other information on the display 418. The network adapter 416 couples the computer 400 to a network.

As is known in the art, a computer 400 can have different and/or other components than those shown in FIG. 4. In addition, the computer 400 can lack certain illustrated components. In one embodiment, a computer 400 acting as a server may lack a keyboard 410, pointing device 414, graphics adapter 412, and/or display 418. Moreover, the storage device 408 can be local and/or remote from the computer 400 (such as embodied within a storage area network (SAN)).

As is known in the art, the computer 400 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 408, loaded into the memory 406, and executed by the processor 402.

Embodiments of the physical components described herein can include other and/or different modules than the ones described here. In addition, the functionality attributed to the modules can be performed by other or different modules in other embodiments. Moreover, this description occasionally omits the term "module" for purposes of clarity and convenience.

Additional Configuration Considerations

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality.

The described operations and their associated modules may be embodied in software, firmware, hardware, or any combinations thereof.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for determining similarity of entities across identifier spaces. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus disclosed herein without departing from the spirit and scope as defined in the appended claims.

What is claimed is:

1. A computer-implemented method of determining a similarity between entities across different identifier spaces, the method comprising:

building a first model specific to a first identifier space using a first set of features correlated with an archetypical population having made a product purchase in the first identifier space as opposed to a standard population, both the archetypical population and the standard population operating in the first identifier space, the first set of features associated with the archetypical population in the first identifier space;

identifying a join panel of entities that each operates in both the first identifier space and a second identifier space, each entity of the join panel having a respective first identifier of an Internet browser of the first identifier space mapped to a respective second identifier of a mobile application of the second identifier space;

applying the first model to each entity of the join panel to compute a score for each respective entity of the join panel, each respective score reflective of the similarity between the respective entity of the join panel and the archetypical population;

selecting a set of contributing entities comprising a plurality of entities from the join panel, each of the contributing entities having a respective score above a threshold;

building a second model specific to the mobile application of the second identifier space by selecting a second set of features correlated with the set of contributing entities as opposed to a second standard population, both the contributing entities and the second standard population operating in the second identifier space, the second set of features associated with the contributing entities in the second identifier space;

predicting the similarity between a target entity operating in the second identifier space and the archetypical population operating in the first identifier space by applying the second model to the target entity operating in the second identifier space, wherein an identifier associated with the target entity in the second identifier space is not mapped to an identifier in the first identifier space;

responsive to the predicted similarity indicating the target entity is likely to be similar to the archetypical population, targeting the target entity to receive advertising content related to the product; and sending the advertising content to the mobile application of the target entity.

2. The method of claim 1, wherein:

each entity operating in the first identifier space is associated with an identifier specific to the first identifier space, and each entity operating in the second identifier space is associated with an identifier specific to the second identifier space.

3. The method of claim 1 wherein:

each entity in the join panel is associated with a respective identifier specific to the first identifier space and a respective identifier specific to the second identifier space, the respective identifier specific to the first identifier space mapped to the respective identifier specific to the second identifier space.

4. The method of claim 1 wherein:

the target entity operating in the second identifier space also operates in the first identifier space, and an identifier associated with the target entity and specific to the first identifier space is not mapped to an identifier associated with the target entity and specific to the second identifier space.

5. The method of claim 1 further comprising:
selecting the archetypical population in the first identifier space according to pre-defined criteria, wherein each entity in the archetypical population fulfills the pre-defined criteria.

6. The method of claim 1 further comprising:
selecting the archetypical population by analyzing histories of entities operating in the first identifier space.

7. The method of claim 1 wherein:
the second set of features are found in the histories of the contributing entities associated with the second identifier space.

8. The method of claim 1 wherein:
building the second model comprises weighting each feature in the second set of features according to the scores of the contributing entities having that feature.

9. A non-transitory computer readable storage medium executing computer program instructions for determining a similarity between entities across different identifier spaces, the computer program instructions comprising instructions for:
building a first model specific to a first identifier space using a first set of features correlated with an archetypical population having made a product purchase in the first identifier space as opposed to a standard population, both the archetypical population and the standard population operating in the first identifier space, the first set of features associated with the archetypical population in the first identifier space;
identifying a join panel of entities that each operates in both the first identifier space and a second identifier space, each entity of the join panel having a respective first identifier of an Internet browser of the first identifier space mapped to a respective second identifier of a mobile application of the second identifier space;
applying the first model to each entity of the join panel to compute a score for each respective entity of the join panel, each respective score reflective of the similarity between the respective entity of the join panel and the archetypical population;
selecting a set of contributing entities comprising a plurality of entities from the join panel, each of the contributing entities having a respective score above a threshold;
building a second model specific to the mobile application of the second identifier space by selecting a second set of features correlated with the set of contributing entities as opposed to a second standard population, both the contributing entities and the second standard population operating in the second identifier space, the second set of features associated with the contributing entities in the second identifier space;
predicting the similarity between a target entity operating in the second identifier space and the archetypical population operating in the first identifier space by applying the second model to the target entity operating in the second identifier space, wherein an identifier associated with the target entity in the second identifier space is not mapped to an identifier in the first identifier space;
responsive to the predicted similarity indicating the target entity is likely to be similar to the archetypical population, targeting the target entity to receive advertising content related to the product; and
sending the advertising content to the mobile application of the target entity.

10. The medium of claim 9 wherein:
each entity operating in the first identifier space is associated with an identifier specific to the first identifier space, and each entity operating in the second identifier space is associated with an identifier specific to the second identifier space.

11. The medium of claim 9 wherein:
each entity in the join panel is associated with a respective identifier specific to the first identifier space and a respective identifier specific to the second identifier space, the respective identifier specific to the first identifier space mapped to the respective identifier specific to the second identifier space.

12. The medium of claim 9 wherein:
the target entity operating in the second identifier space also operates in the first identifier space, and an identifier associated with the target entity and specific to the first identifier space is not mapped to an identifier associated with the target entity and specific to the second identifier space.

13. The medium of claim 9 wherein the instructions further comprise:
selecting the archetypical population in the first identifier space according to pre-defined criteria, wherein each entity in the archetypical population fulfills the pre-defined criteria.

14. The medium of claim 9 wherein the instructions further comprise:
selecting the archetypical population by analyzing histories of entities operating in the first identifier space.

15. The medium of claim 9 wherein the instructions further comprise:
building the second model by weighting each feature in the second set of features according to the scores of the contributing entities having that feature.

16. A system comprising:
a processor;
a computer readable storage medium storing processor-executable computer program instructions for predicting the similarity between entities across different identifier spaces, the computer program instructions comprising instructions for:
building a first model specific to a first identifier space using a first set of features correlated with an archetypical population having made a product purchase in the first identifier space as opposed to a standard population, both the archetypical population and the standard population operating in the first identifier space, the first set of features associated with the archetypical population in the first identifier space;
identifying a join panel of entities that each operates in both the first identifier space and a second identifier space, each entity of the join panel having a respective first identifier of an Internet browser of the first identifier space mapped to a respective second identifier of a mobile application of the second identifier space;
applying the first model to each entity of the join panel to compute a score for each respective entity of the join panel, each respective score reflective of the similarity between the respective entity of the join panel and the archetypical population;
selecting a set of contributing entities comprising a plurality of entities from the join panel, each of the contributing entities having a respective score above a threshold;
building a second model specific to the mobile application of the second identifier space by selecting a second set of features correlated with the set of contributing entities as opposed to a second standard population, both the contributing entities and the second standard population operating in the second identifier space, the second set of features associated with the contributing entities in the second identifier space;

predicting the similarity between a target entity operating in the second identifier space and the archetypical population operating in the first identifier space by applying the second model to the target entity operating in the second identifier space, wherein an identifier associated with the target entity in the second identifier space is not mapped to an identifier in the first identifier space;

responsive to the predicted similarity indicating the target entity is likely to be similar to the archetypical population, targeting the target entity to receive advertising content related to the product; and sending the advertising content to the mobile application of the target entity.

* * * * *